(12) United States Patent
Aitchison

(10) Patent No.: US 10,876,908 B2
(45) Date of Patent: Dec. 29, 2020

(54) PIEZOCAPACITIVE TEXTILE USING GRAPHENE

(71) Applicant: IMAGINE INTELLIGENT MATERIALS LTD, Sydney (AU)

(72) Inventor: Phillip Aitchison, Sydney (AU)

(73) Assignee: IMAGINE INTELLIGENT MATERIALS LTD, Menai (AU)

(\*) Notice: Subject to any disclaimer, the term of this patent is extended or adjusted under 35 U.S.C. 154(b) by 0 days.

(21) Appl. No.: 16/494,209

(22) PCT Filed: Mar. 13, 2018

(86) PCT No.: PCT/AU2018/050225
§ 371 (c)(1),
(2) Date: Sep. 13, 2019

(87) PCT Pub. No.: WO2018/165703
PCT Pub. Date: Sep. 20, 2018

(65) Prior Publication Data
US 2020/0049575 A1 Feb. 13, 2020

(30) Foreign Application Priority Data
Mar. 13, 2017 (AU) .................................. 2017900865

(51) Int. Cl.
*G01L 1/00* (2006.01)
*G01L 1/16* (2006.01)
*G01L 1/14* (2006.01)
*G01L 9/00* (2006.01)

(52) U.S. Cl.
CPC .................. *G01L 1/16* (2013.01); *G01L 1/14* (2013.01); *G01L 9/008* (2013.01)

(58) Field of Classification Search
CPC .............. G01L 1/16; G01L 1/14; G01L 9/008
USPC ..................................................... 73/862.626
See application file for complete search history.

(56) References Cited

U.S. PATENT DOCUMENTS

| 9,582,098 B2* | 2/2017 | Rosenberg | G06F 3/044 |
| 10,179,064 B2* | 1/2019 | Connor | A61F 7/0097 |
| 2016/0305824 A1* | 10/2016 | Ozyilmaz | G01J 5/34 |
| 2017/0308781 A1* | 10/2017 | Foerster | G06K 19/067 |
| 2019/0212222 A1* | 7/2019 | Aitchison | E02D 31/004 |
| 2020/0191549 A1* | 6/2020 | Aitchison | G01L 1/205 |

OTHER PUBLICATIONS

Liu W. et al., "Flexible and conductive nanocomposite electrode based on graphene sheets and cotton cloth for supercapacitor", Journal of Materials Chemistry, 22, Jul. 2012,pp. 17245-17253.
Wang Y.S et al., "Integration of tailored reduced graphene oxide nanosheets and electrospun polyamide-66 nanofabrics for a flexible supercapacitor with high-volume and high-area-specific capacitance", Carbon 73, Feb. 19, 2014, pp. 87-98.
(Continued)

*Primary Examiner* — Max H Noori
(74) *Attorney, Agent, or Firm* — AEON Law, PLLC; Adam L. K. Philipp; Jonathan E. Olson

(57) ABSTRACT

A textile with an electrically conductive first side and an electrically conductive second side where the two sides are separated by an electrically insulating part of the textile and where the electrically conductivity is provided by a graphene coating on the respective sides and where a capacitance can be formed between the respective conductive sides.

5 Claims, 2 Drawing Sheets

(56) References Cited

OTHER PUBLICATIONS

Zhao C. et al., "Reduced graphene oxide and polypyrrole/reduced graphene oxide composite coated stretchable fabric electrodes for supercapacitor application", Electrochimica Acta, vol. 172, Aug. 1, 2015, pp. 12-19.

* cited by examiner

PIEZOCAPACITIVE TEXTILE USING GRAPHENE

TECHNICAL FIELD

The invention relates to the field of Piezocapacitive textiles. In particular, the invention relates to an electrically conducting Piezocapacitive textile that changes electrical properties when compressed.

BACKGROUND OF THE INVENTION

Strain and pressure gauges are widely used. Pressure gauges can be highly precise and can be made by many means from many materials. Typically they are stand-alone electrical devices using a material or arrangement of materials that undergo a change in electrical properties when pressure is applied. The change in electrical property is usually resistance, capacitance or inductance. In many cases the pressure gauge is a form of strain gauge.

Deformation of a material changes the relative positions of the components of the material, resulting in strain. Such deformation may be elastic or inelastic, a combination of both or only partially elastic, with some permanent deformation occurring with each deformation. The deformation may be compressive or extensive and may occur in any or all of the three physical dimensions. In practice compression of a sheet of material by applying a force perpendicular to the plane of the sheet makes the sheet thinner in the area of applied force. Stretching a sheet of material that can be compressed in the plane of the sheet often also makes it thinner. Various individual or combinations of these deformations can be used to measure strain.

Strain gauges often use a deformable electrical conductor, such as a thin metal wire or foil in a complex pattern to maximise sensitivity bonded to a flexible or stretchable insulating sheet. When the insulator is stretched or compressed, the electrical conductor is deformed and its resistance changes.

A plurality of sheets of conductive material can be arranged with a compressible insulator between pairs of sheets. If a voltage is applied across two electrically insulated conductive sheets a capacitor is formed. When compressed the insulator becomes thinner and the capacitance changes. The formula below gives the relationship between the separation of the two conductive sheets and the capacitance of the structure. This relationship shows that capacitance (C) is directly proportional to the area (A) of the conductive sheets and the separation between them (d). As the separation (d) decreases the capacitance increases and vice versa.

$$C \alpha A/d$$

Piezocapacitance is the change in capacitance that occurs when the insulator between the two electrically conducting surface of a capacitor changes thickness. This allows a deformable insulator combined with two or more deformable conductive sheets to be used as part of a capacitor-based strain sensor.

Measurement of capacitance can be achieved by many means. Modern digital equipment and semiconductor technology allows easy, accurate and relatively low cost measuring equipment to measure capacitance.

Electrical resistance in a thin sheet can be reported in the unit "Ohms per square" ("Ohm/sq" or "Ohm/□") is often used and referred to as "sheet resistance". Sheet resistance is normally applied to uniform thickness films, but can also be applied to non-uniform sheets of conductors, such as a textile.

Strain sensing over large areas requires materials that are robust and relatively inexpensive. Semiconductor technology is inappropriate. Metal foils and other conducting films can be used to form capacitors, however these tend to lack elasticity, may be affected by the environment and are often impermeable to air or liquids, limiting their use.

Accordingly, it is an object of the invention to provide a Piezocapacitive material that ameliorates at least some of the problems associated with the prior art.

SUMMARY OF THE INVENTION

According to a first aspect of the invention, there is provided a Piezocapacitive textile incorporating graphene.

Textiles, such as fabrics or cloths, are flexible materials consisting of a network of natural and/or artificial fibres. A wide range of materials can be made into fibres dependant on the desired properties and application. Textiles are often porous, allowing air and water to pass through the textile and can be tailored to optimise their properties for various applications, including maximising or minimising porosity, strength, elasticity, chemical interactions and other beneficial properties dependent on the desired application of the textile.

Textiles can be formed from fibres by many methods, including: weaving, knitting, knotting, braiding and non-woven overlay techniques with further steps, such as inter-tangling (e.g. needle punch, felting, hydro-entanglement, spun lacing, water needling) and can include various steps to improve the desired properties, such as carding, heat bonding and coating.

Conductive textiles can be made from electrically conductive fibres, such as: metals; conductive polymers (e.g. polypyrole); carbon-filled polymer fibres and; metal-filled polymer fibres. Further, the textiles can be made from coated fibres, where a non-conductive polymer (polyolefin or natural fibre) is coated with an electrically conductive layer (such as those noted here), and then the fibres are made into a textile. In some cases the conductive textile is made from a mixture of conductive and non-conductive fibres depending on the desired properties. Alternatively textiles can be made conductive by coating the textile with a conductive material.

Electrically conductive textiles are typically expensive in comparison to non-conductive textiles, thus limiting the size of individual applications and the breadth of applications.

There are many industrial uses of textiles. Sometimes referred to as 'technical textiles' these range from civil engineering and related geotechnical applications, to construction, manufacturing and automotive. Generally they are regarded as non-aesthetic and form a component of another part. Very few cost-effective options are available for large-scale electrically conductive textiles.

Textiles for clothing and medical applications with a strain and or pressure response usually rely on complex electrical components being embedded in the textile, or attached to the textile after the item has been formed. In some cases the sensor is printed onto the textile using conductive inks. In such cases the sensor is a discreet object and not an inherent part of the textile.

The inventors have found that conductive textiles exhibiting a Piezocapacitive effect can be made with graphene. They have further determined that such textiles can be successfully used as pressure and strain sensors.

Graphene is essentially an individual layer of graphite and can be formed by many routes, including "top-down" approaches such as mechanical or electrochemical exfoliation of graphite, chemical oxidation of graphite and exfoliation as graphene oxide followed by partial or complete reduction to graphene and "bottom-up" approaches such as growth from gases or plasmas on substrates or catalysts. The character of the graphene can vary from nearly atomically perfect single layers through two-layer, few-layer and multi-layer graphene all the way up a scale of number of layers which culminates in large agglomerates similar to ultra-fine graphite. Graphene has a high aspect ratio, being ultimately only one atomic layer thick (less than one nanometre) and typically hundreds of nanometres to hundreds of microns in the planar directions. Thus, graphene is referred to as being a two-dimensional (2D) material. Graphene is an excellent electrical conductor.

For example, the invention may be embodied by a textile with an electrically conductive first side and an electrically conductive second side where the two sides are separated by an electrically insulating part of the textile and where the electrically conductivity is provided by a graphene coating on the respective sides and where a capacitance can be formed between the respective conductive sides. In such an embodiment, the textile may undergo an elastic deformation in the plane of the textile when subjected to strain in the plane of the textile. This deformation may be perpendicular to the plane of the textile when subjected to compression perpendicular to the plane of the textile. This is likely to cause a measurable change in capacitance.

The graphene may be applied to the textile after formation of the textile. It may be applied to both sides of the textile so that part of the thickness of the textile does not contain graphene and the two sides of the textile are either unconnected electrically, or connected by a high electrical resistance path.

The textile as described above may have an electrical resistance between the two coated sides of the textile of greater than 1,000,000 Ohms, greater than 500,000 Ohms, greater than 100,000 Ohms, greater than 10,000 Ohms, greater than 1000 Ohms, or greater than 100 Ohms.

Alternatively, the graphene may be applied to fibres comprising the textile after formation of the fibres.

Alternatively, the graphene may be incorporated into fibres comprising the textile.

The above described fibres may be electrically conductive, allowing the formation of an electrically conductive textile. This textile may be formed so as not to be uniformly electrically conductive. The proportion of electrically conductive fibres may be 100%, alternatively greater than 50%, alternatively greater than 10%, alternatively greater than 1%.

The invention alternatively provides a textile with a first side comprising at least one area containing graphene that is electrically conductive and a second side comprising at least one area containing graphene such that a capacitance can be formed between at least one of the areas on the first side and at least one of the areas on the second side and where that capacitance can change when the textile is deformed.

The textile may be configured such that a first area of electrical conductivity on each of the first and second side is connected to a second and third area of electrical conductivity on the respective side. The second and third areas of electrical conductivity may be used to connect electrical equipment to the first area.

The textile above, with a repeating pattern comprising a first, second and third area, may be configured such that the second and third areas are not electrically connected to each other on the textile except where a first area is interposed between the second and third areas.

An electrical circuit can be made by connection to the second and third areas and where the position of connection of the circuit creates an electrical pathway with a first resistance to a first area and a second resistance to a second first area where the first and second resistances are different.

An alternative embodiment provides and arrangement of two or more textiles where each textile comprises a first surface containing graphene that is electrically conductive and a second, opposing surface that is electrically insulating. The two or more textiles are arranged such that two or more capacitors can be formed across the first areas. The first surfaces may be connected to third areas containing graphene which are electrically conductive and where the third areas are used to connect electrical equipment to the first areas.

An alternative embodiment provides a graphene coating on a textile that confers electrical conductivity and does not substantially change the porosity, elasticity or flexibility of the textile.

An alternative embodiment provides a graphene coating on a textile that confers electrical conductivity and increases the water affinity of the textile.

An alternative embodiment provides a textile comprising a first area containing graphene that is electrically conductive and a second area containing graphene that is electrically conductive, where the first area and second area are located so that an electrically isolating third area of the textile separates the first area and second area such that a capacitor can be formed across the first area and second area. The first and second areas may be connected respectively to fourth and fifth areas containing graphene which are electrically conductive and where the fourth and fifth areas are used to connect electrical equipment to the first and second areas respectively.

Now will be described, by way of specific, non-limiting examples, preferred embodiments of the invention with reference to the drawings.

DETAILED DESCRIPTION OF THE INVENTION

Figure 1:
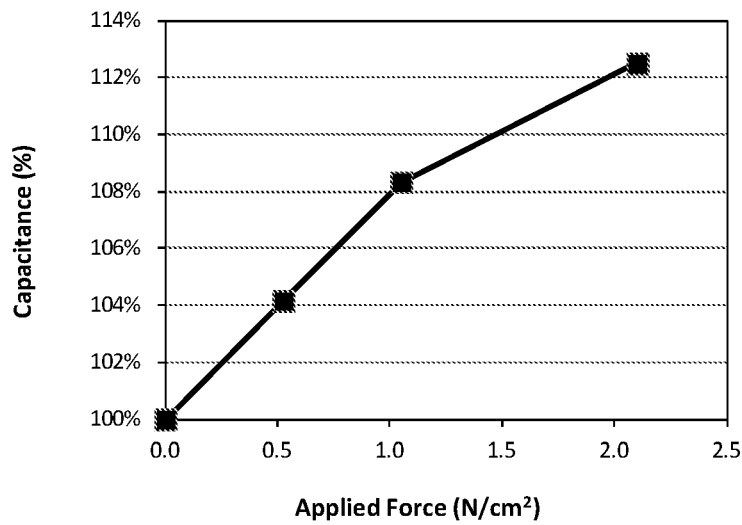
FIG. 1 is a graph showing the change in electrical capacitance with application of pressure of a square of textile sensor made from non-woven polyester coated on two sides with graphene whilst maintaining electrical isolation between each side of the unloaded textile.

Various forms of graphene exist. Ideal graphene is pure carbon and the best electrical conductor in the graphene family and one of the best conductors ever discovered. It is free of defects and other chemical functionality, such as oxygen. Graphene oxide (GO) is a highly oxidised form of graphene that is an electrical insulator. Intermediary species can be referred to by various descriptions, such as partially reduced graphene oxide (prGO) or functionalised graphene, where various chemical groups are attached to the edges and/or basal planes of the graphene. This functionality allows tailoring of the electrical and physical properties of the graphene, for example to make it easier to incorporate into or onto materials, such as plastics to form composites.

Incorporation of heteroatoms, where carbon atoms are replaced by other atoms, such as nitrogen and other covalently bonded atoms can also be used to tailor the properties of graphene.

Graphene can also come in various dimensions, whether it be single layers of graphene or multiple layers. Various terminologies have been used to describe the structural permutations and some attempts have been made at standardising terminology. Regardless of terminology these single-layer and multi-layer structures of graphene have useful conductivity that give rise to the properties in polymers, fibres and textiles as described here.

These various permutations of graphene are generalised here as "graphene" unless otherwise detailed and their properties described. The continuous scale from electrically conductive to electrically insulating means many forms of graphene can be used as an electrical conductor and even poorly conducting graphene can serve the purpose, especially where it's other properties make it desirable for use.

Graphene can be produced by many routes, including: anodic bonding; carbon nanotube cleavage; chemical exfoliation; chemical synthesis; chemical vapour deposition; electrochemical exfoliation; electrochemical intercalation; growth on silicon carbide; liquid phase exfoliation; micromechanical cleavage; microwave exfoliation; molecular beam epitaxy; photo-exfoliation; precipitation from metal, and; thermal exfoliation. Some of these routes give rise to materials referred to as: chemically converted graphene; few-layer graphene; GO; graphene; graphene oxide; graphene nanoflakes; graphene nanoplatelets; graphene nanoribbons; graphene nanosheets; graphite nanoflakes; graphite nanoplatelets; graphite nanosheets; graphite oxide; LCGO; liquid crystal graphene oxide; multi-layer graphene; partially reduced graphene oxide; partially reduced graphite oxide; prGO; rGO; reduced graphene oxide; reduced graphite oxide.

Incorporation of graphene into or onto a textile can be achieved by many methods, but in each case the properties of the fibres and the textile will affect the method of incorporation. The method of incorporation will depend on the fibre and textile chemistry, graphene chemistry, graphene shape and processes used to incorporate the graphene into or onto the fibres and the process of forming a textile.

For synthetic or composite fibres, preferred methods include mixing the graphene into the polymer or composite prior to forming synthetics fibres. Both natural and synthetic fibres can be coated with graphene to make a conductive fibre and textiles and textile intermediates can be coated to provide conductivity in the textile. For dispersion of the graphene into a polymer for synthetic fibres or composite fibres the graphene can be present as a powder or as a dispersion in a fluid. Pre-dispersion of the graphene in a suitable fluid facilitates dispersion of the graphene in the polymer. Coating the graphene is preferably from a dispersion of graphene in a fluid. Methods of incorporation of graphene into the polymer can include: Melt-compounding of graphene into the polymer; in-situ polymerisation of the polymer with the graphene, and; solution blending. Whichever technique is used, it is desirable that the graphene is sufficiently dispersed to achieve electrical conductivity with a minimum of graphene.

In some cases additives are required to reduce phase separation of the graphene and the polymer.

A preferred embodiment is where the textile is coated on both sides with a fluid containing graphene that leaves a thin layer of graphene adhered to the surface of the textile without substantially changing the physical properties of the textile and providing an electrically insulating separation between the two conductive sides of the textile.

In another embodiment the textile is coated on only one side with graphene and the capacitive sensor is formed by bringing two pieces of the coated textile together so that an electrically insulating gap is maintained between the two coated surfaces.

In some embodiments it is desirable that the graphene coating does not substantially change the properties of the original textile. For example, the coating does not substantially block the pores of the textile, or substantially reduce the textile elasticity and flexibility.

In other embodiments the graphene changes one or more properties of the textile in a desirable way, such as making the textile more hydrophilic, improving its ability to absorb water or for liquid water or water vapour to pass through the textile.

In another embodiment the textile is formed from fibres that include graphene to provide the conductive parts of the capacitor and fibres that do not contain graphene to form the insulating part of the capacitive sensor. The fibres are formed by melt extrusion from pellets or powders of the polymer. The graphene is added to the melt extrusion in a concentrated form dispersed in a carrier polymer, which may be the same as the bulk polymer, or may be different. The concentrated form of the graphene polymer dispersion is mixed and diluted in the melt extrusion process to obtain the desired concentration of graphene in the fibres. The textile is formed from two or more layers of fibres, where a first layer is electrically conductive and a second layer is non-conductive.

In another embodiment the concentrated form of the graphene is dispersed in a fluid, such as: oil, solvent or water prior to incorporation into the polymer and formation of the fibre.

In another embodiment the fibre is formed from a solution dispersion of graphene by a method known as "wet spinning", where the solution is formed into a fibre by a combination of chemistry and mechanical manipulation. In some cases wet-spun fibres can be simultaneously coated with graphene and multi-layer structures formed.

In a preferred embodiment a compressible textile was coated on both sides with graphene. Each of the two coatings penetrated into the textile, but not sufficiently to form a significant electrical circuit between the two coatings. This three-layer sandwich structure of two conductive layers separated by an insulating layer creates two mechanisms for measuring strain. In the first mechanism compression of any part of the textile brings the two conductive layers close together and increases the capacitance between the two conductive layers. This change in capacitance between the two layers allows the textile to be a pressure sensor. The increase or decrease in capacitance is proportional the degree of electrical separation between the two conductive layers, which is dependent on the physical separation of the conductive layers.

Even very low conductivity in the electrically conductive layers gives rise to capacitance. Various arrangements of the capacitor are possible and still allow it to be used as a strain sensor, including where the area (A) of each of the two or more conductive sheets is different, where the separation (d) is variable over the area (A) of the capacitor and where the conductivity of the sheets can vary considerably. In some cases the insulator is a poor insulator, allowing charge to pass through the circuit formed during polarisation of the capacitive sheets.

The area (A) of a capacitor is often defined by the two dimensional geometric cross-sectional surface area. However, capacitance depends on the amount of charge that can be stored, which is a function of the total surface area of the sheet, or electrode. Electrodes for capacitors can have volume (thickness), which increases the capacitance beyond that predicted by a simple cross-sectional area measurement. The amount of charge capable of being stored can also be increased by increasing charge density, including the use of chemical charge carriers. These two concepts are used in supercapacitors, which increase the area (A) by using very high surface area materials. Graphene has a very high specific surface area, predicted by theory to be up to 2630 $m^2/g$.

In some embodiments the strain sensor can combine a capacitive element with a non-capacitive mechanism for storing charge, such as a battery or a chemical process. Fundamentally the sensing is provided by a compressible insulator separating at least one capacitive element from a second charge storage element.

The present invention will now be described with reference to the following non-limiting examples.

Example 1: Graphene nanoplatelets (GNP) were made by thermal exfoliation of expandable graphite at 950° C. in nitrogen, followed by exfoliation by ultrasonication in water. Scanning electron microscopy (SEM) showed the platelets were on average approximately 1 micron in diameter and ranged from single layer up to more than 10 layers. The graphene was mixed with an aqueous acrylic binder to give a 2 wt. % graphene dispersion, which was then blade coated onto both sides of an approximately 2.0 mm thick, 140 $g/m^2$ melt-spun, non-woven, needle-punched polyester. A sample of size 14 cm by 14 cm was tested electrically and the two coated sides remained electrically isolated from each other (>20 MΩ electrical resistance) showing that the coatings had not penetrated to the extent that they were electrically connected. Electrical resistance was measured on each side of the textile respectively as 17 kΩ per square and 26 kΩ per square. FIG. 1 shows the pressure response curve for the coated textile for capacitance when an area 14 cm by 4 cm (56 $cm^2$) was compressed. Capacitance was measured with a multimeter to be 0.24 nanoFarads prior to compression and was observed to increase with compression, as per FIG. 1.

Figure 2:
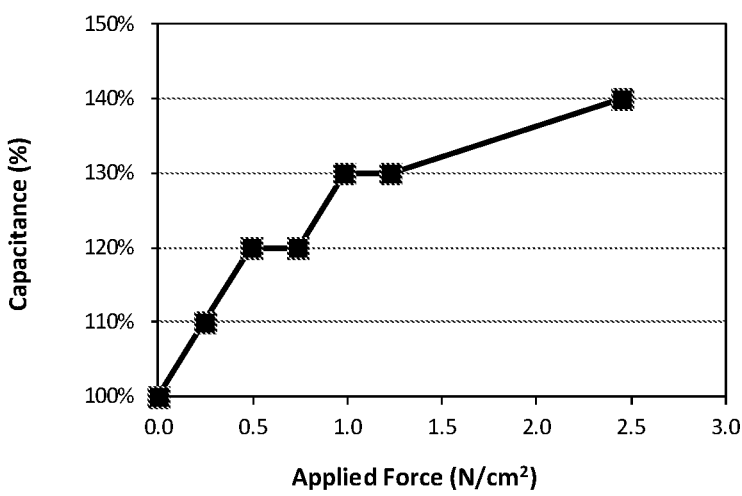
FIG. 2 is a graph showing the change in electrical capacitance of a sandwich made from two rectangles of textile sensor, each made from non-woven polyester coated on one side with graphene. The two pieces of textile are arranged with the conductive surface of one textile in contact with the non-conductive back of the other textile. Electrical isolation is maintained between the two conducting surfaces of the textiles.

Example 2: Graphene nanoplatelets (GNP) were made by thermal exfoliation of expandable graphite at 1050° C. in argon, followed by exfoliation by ultrasonication in water. Scanning electron microscopy (SEM) showed the platelets were on average approximately 1 micron in diameter and ranged from single layer up to more than 10 layers. The graphene was mixed with an aqueous acrylic binder to give a 2 wt % graphene dispersion and blade coated onto one side of an approximately 190 $g/m^2$ melt-spun, non-woven, needle-punched polyester. The final dry loading of graphene was 3.7 $g/m^2$ (about 2 wt. %). Electrical resistance was measured on the conductive side of the textile to be approximately 3400Ω per square. Two pieces of the single-sided coated textile were arranged conductive face of a first piece of textile in contact with the non-conductive face to the second piece of textile. Pressure was applied with a rigid disc of area 40 $cm^2$. FIG. 2 shows the pressure response curve for the coated textile.

Figure 3:
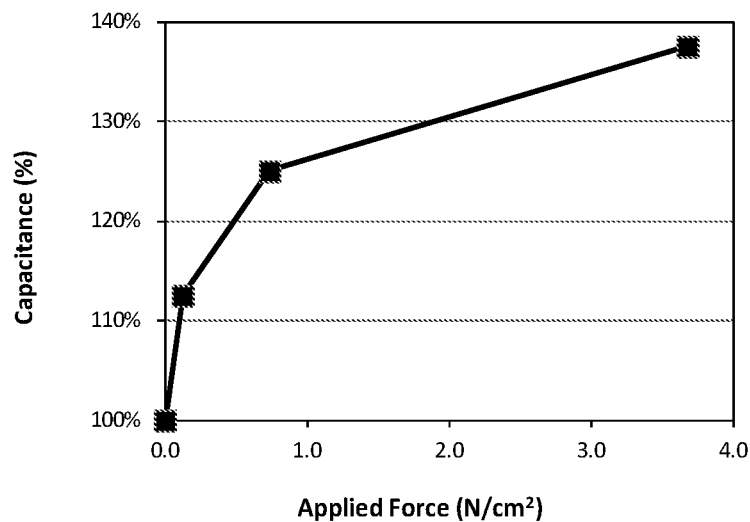
FIG. 3 is a graph showing the change in electrical capacitance of a sandwich made from two rectangles of textile sensor, each made from non-woven polyester coated on one side with graphene. The two pieces of textile are arranged with the non-conductive backs of each textile in contact with each other. Electrical isolation is maintained between the two conducting surfaces of the textiles.

Example 3: As per Example 2, graphene nanoplatelets (GNP) were made by thermal exfoliation of expandable graphite at 1050° C. in argon, followed by exfoliation by ultrasonication in water. The graphene was mixed with an aqueous acrylic binder to give a 2 wt % graphene dispersion which was then blade coated onto a first side of an approximately 1.5 mm thick, 140 $g/m^2$ melt-spun, non-woven, needle-punched polyester. The total coating loading was approximately 18 $g/m^2$ (13 wt. %). The resistivity of the conductive surface is 2.6 (±0.3) kΩ per square. Two samples, each 14 cm by 14 cm with a first side that is electrically conductive and a second side that is electrically insulating were aligned in a sandwich structure where the second (insulating) face of one sample was in contact with the second (insulating) face of the other sample. The two coated sides were electrically isolated from each other (>20 MΩ electrical resistance). FIG. 3 shows the pressure response curve for the sandwich when an area of 40 $cm^2$ was compressed with an electrically insulating rigid disc. Capacitance was measured with a multimeter to be 0.08 nanoFarads prior to compression and to increase with compression, as per FIG. 3.

Example 4: A textile was prepared as in Example 2. Two pieces of the textile, each 180 cm by 50 cm, with a first face that is electrically conductive and a second face that is electrically insulating, were aligned in a sandwich where the second face of one sample was in contact with the second face of the other sample. The two coated faces were electrically isolated from each other (>20 MΩ electrical resistance). Capacitance was measured with a multimeter to be 1.96 nanoFarads prior to compression and to increase with compression.

Figure 4:
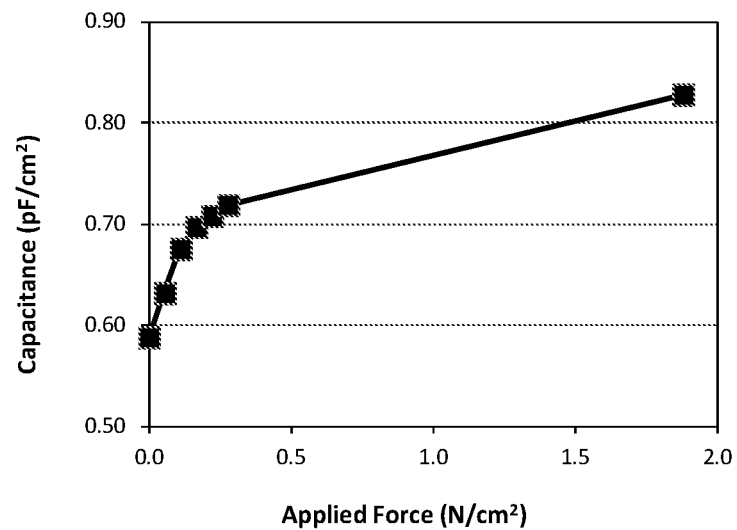
FIG. 4 is a graph showing the change in electrical capacitance of a sandwich made from two rectangles of textile sensor, each made from non-woven polyester coated on one side with graphene with a plastic geogrid interposed between. The two pieces of textile are arranged with the non-conductive faces of each textile in contact with the geogrid. Electrical isolation is maintained between the two conducting surfaces of the textiles.

Example 5: A three-layered structure was made from two rectangles of textile, each made from non-woven polyester coated on one side with graphene. The two pieces of textile are arranged with the non-conductive back of one textile facing the conductive side of the other, leaving an electrically insulating layer consisting of the two non-conductive faces of the textile rectangles. A sample of commercially available electrically insulating Tensar® Triax® triangular geogrid was placed in between the two layers of textile. The area of overlap of the three layers was 460 $cm^2$. A sheet of electrically insulating and rigid Perspex was placed over the three-layered sandwich. Weight was applied to the Perspex and the change in capacitance recorded. With no applied pressure the capacitance measured was 0.60 (±0.1) picoFarads per centimetre square ($pF/cm^2$). FIG. 4 shows the results of compression. It was observed to increase to above 0.8 $pF/cm^2$.

Example 6: In a similar arrangement to Example 4, two large sheets (approximately 1 m by 2 m) were laid on top of each other on the ground. A multimeter was attached to each layer in one corner the capacitive structure. When a person walked on the large area sensor the capacitance could be measured to change with each footfall. As the foot was lifted, capacitance went down, when the foot was placed back onto the two-layer textile structure the measured capacitance increased. In this way a person walking, standing on one foot, or on both feet could be detected and differentiated.

Example 7: Two rectangles approximately 15 cm by 55 cm of the textile as prepared in Example 2 were arranged with non-conductive faces touching. Approximately 3 cm of cold-setting bitumen (also known as asphalt) was formed at right angles (90°) over the two textiles covering an area of approximately 40 cm by 60 cm so that approximately 7 cm of textile protruded from each side of the bitumen. The conductive face of the topmost layer of textile was in contact with the bitumen. The bitumen was allowed to cure for several days to harden. The area covered by the bitumen is approximately 15 cm by 40 cm. The capacitance of the sensor was measured to be 0.35 nF. A car was then driven over the composite structure. When the front wheel of the small station wagon passed over the sensor the capacitance increased to 0.41 nF and when the back wheel travelled over the sensor the capacitance increased to 0.39 nF. The measurements were repeatable to approximately ±0.01 nF (3%).

Example 8: As per Example 6, the approximately 2 $m^2$ sample of capacitive textile was laid on a mattress and covered with bed sheets. The capacitance with no additional weight loading was approximately 3.63 nF. When a 35 kg child sat on the bed the capacitance increased to approximately 3.91 nF, when lying prone the capacitance increased further to approximately 4.51 nF. Movement on the bed was clearly registered as a significant change in capacitance. In the absence of movement the capacitance was stable.

It will be appreciated by those skilled in the art that the above described embodiment is merely one example of how the inventive concept can be implemented. It will be understood that other embodiments may be conceived that, while differing in their detail, nevertheless fall within the same inventive concept and represent the same invention.

The invention claimed is:

1. A piezocapacitive textile incorporating graphene; wherein said textile incorporates a first side comprising at least one area containing graphene that is electrically conductive and a second side comprising at least one area containing graphene such that a capacitance is formed between at least one of said areas on said first side and at least one of said areas on said second side and where said capacitance can change when the textile is deformed; and wherein a first area of electrical conductivity on each of said first and second side is connected to a second and third area of electrical conductivity on each of said first and second sides; wherein said second and third areas of electrical conductivity are adapted to connect electrical equipment to said first area or areas.

2. The textile according to claim 1 wherein said first, second and third areas are arranged in a repeating pattern; wherein said second and third areas are only electrically connected to each other in the region where said first area is interposed between said second and third areas.

3. The textile incorporating a pattern according to claim 2, wherein an electrical circuit can be made via electrical connection of more than one first area to one of said second and third areas; and wherein the position of connection of the circuit in said areas is selected so as to create an electrical pathway with a first resistance to a first area and a second resistance to another first area wherein said first and second resistances are different.

4. An arrangement of two or more piezocapacitative textiles incorporating graphene; wherein each textile comprises a first surface containing graphene that is electrically conductive and a second, opposing surface that is electrically insulating, and wherein the two or more of said textiles are arranged such that two or more capacitances can be formed across said first surfaces; wherein the said first surfaces are further electrically connected to third electrically conductive areas containing graphene; and wherein said third areas are electrically connected to electrical equipment, thereby allowing said equipment to be electrically connected to said first surfaces.

5. A piezocapacitive textile comprising a first area containing graphene that is electrically conductive and a second area containing graphene that is electrically conductive, wherein said first area and said second area are located so that an electrically isolated third area of the textile separates the first area and second area such that an electrical capacitance is formed between the first area and second area; wherein the first and second areas are connected respectively to fourth and fifth electrically conductive areas containing graphene, and wherein the fourth and fifth areas are used to connect electrical equipment to the first and second areas respectively.

* * * * *